(12) United States Patent
Ying et al.

(10) Patent No.: US 10,824,537 B2
(45) Date of Patent: Nov. 3, 2020

(54) METHOD, DEVICE, AND COMPUTER READABLE MEDIUM FOR TRACING COMPUTING SYSTEM

(71) Applicant: Dell Products L.P., Round Rock, TX (US)

(72) Inventors: Zhi Ying, Shanghai (CN); Junping Zhao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/240,244

(22) Filed: Jan. 4, 2019

(65) Prior Publication Data
US 2019/0220384 A1    Jul. 18, 2019

(30) Foreign Application Priority Data

Jan. 18, 2018    (CN) .......................... 2018 1 0050770

(51) Int. Cl.
| | | |
|---|---|---|
| *G06F 9/45* | (2006.01) | |
| *G06F 11/34* | (2006.01) | |
| *G06F 11/07* | (2006.01) | |
| *G06F 9/54* | (2006.01) | |
| *G06F 9/38* | (2018.01) | |
| *G06F 11/30* | (2006.01) | |

(52) U.S. Cl.
CPC ........ *G06F 11/3466* (2013.01); *G06F 9/3877* (2013.01); *G06F 9/541* (2013.01); *G06F 9/544* (2013.01); *G06F 11/0709* (2013.01); *G06F 11/3006* (2013.01); *G06F 11/3068* (2013.01); *G06F 11/3476* (2013.01)

(58) Field of Classification Search
CPC .... G06F 11/3466; G06F 9/3877; G06F 9/541; G06F 9/544; G06F 11/0709; G06F 11/3006; G06F 11/3068; G06F 11/3476
USPC ........................................................ 717/128
See application file for complete search history.

(56) References Cited

U.S. PATENT DOCUMENTS

| | | | | |
|---|---|---|---|---|
| 9,164,785 B2 * | 10/2015 | Kraft | ................... | G06F 9/45533 |
| 2015/0339210 A1 * | 11/2015 | Kopp | .................. | G06F 11/3495 |
| | | | | 718/100 |

OTHER PUBLICATIONS

Illarion Khlestov, "HowTo Profile TensorFlow:," https://towardsdatascience.com/howto-profile-tensorflow-1a49fb18073d, Mar. 23, 2017, 8 pages.

(Continued)

*Primary Examiner* — Chuck O Kendall
(74) *Attorney, Agent, or Firm* — Ryan, Mason & Lewis, LLP (57) ABSTRACT

Embodiments of the present disclosure relate to a method of tracing a computing system, a device for tracing a computing system, and a computer readable medium. According to some embodiments, tracing data is extracted from a request that requests a dedicated processing resource for a task, the request being initiated by an application executed on a client and the tracing data including a parameter for performing the task, an identifier of the application, and time elapsed from initiating the request. The tracing data is stored in a volatile memory to facilitate transmitting the tracing data to a database server. The request is caused to be processed by a computing server hosting the dedicated processing resource. In this way, the cloud computing system may be traced rather than tracing the stand-alone tasks only.

20 Claims, 5 Drawing Sheets

(56) References Cited

OTHER PUBLICATIONS

Nvidia, "Profiler User's Guide," www.nvidia.com, Oct. 2018, 142 pages.
U.S. Appl. No. 16/173,039 filed in the name of Junping Zhao et al. filed Oct. 29, 2018 and entitled "Method, System and Computer Program Product for Processing Computing Task."

* cited by examiner

METHOD, DEVICE, AND COMPUTER READABLE MEDIUM FOR TRACING COMPUTING SYSTEM

RELATED APPLICATION(S)

The present application claims priority to Chinese Patent Application No. 201810050770.5, filed Jan. 18, 2018 and entitled "Method, Device, and Computer Readable Medium for Tracing Computing System," which is incorporated by reference herein in its entirety.

FIELD

Embodiments of the present disclosure generally relate to a computing system including dedicated processing resources, and more specifically, to a method, device and computer readable medium for tracing a computing system.

BACKGROUND

Applications on a client can be designed to complete various processing or analyzing tasks using computing resources, such as processing and storage resources. As the requirement and complexity of the tasks (for example, machine learning, deep learning, and data mining) continuously grow, it requires a large amount of and/or variable computing resources to satisfy operations of the corresponding application. This can be fulfilled by a machine or system having multiple dedicated processing resources, where the application can be scheduled to operate on one or more dedicated processing resources of the machine or system. For example, a cloud-based computing system has already been developed, and this computing system includes a machine having one or more dedicated processing resources. Different clients can rent computing resources (for example, dedicated processing resources) of the system as required to operate their own applications.

However, some existing technical solutions only trace and monitor a standalone version of the dedicated processing resources, and are not applicable to the computing system above. Therefore, there is a need for a solution for tracing and monitoring the computing system above.

SUMMARY

Embodiments of the present disclosure provide a method, device and corresponding computer readable medium for tracing a computing system.

According to a first aspect of the present disclosure, there is provided a method of tracing a computing system. The method comprises extracting tracing data from a request that requests a dedicated processing resource for a task, the request being initiated by an application executed on a client and the tracing data including a parameter for executing the task, an identifier of the application and time elapsed from initiating the request; storing the tracing data in a volatile memory to facilitate the tracing data to be transmitted to a database server; and causing the request to be processed by a computing server hosting the dedicated processing resource.

According to a second aspect of the present disclosure, there is provided a device for tracing a computing system. The device comprises at least one processor; a volatile memory; and a memory coupled to the at least one processor, the memory having instructions stored thereon, the instructions, when executed by the at least one processor, causing the device to perform acts including: extracting tracing data from a request that requests a dedicated processing resource for a task, the request being initiated by an application executed on a client and the tracing data including a parameter for executing the task, an identifier of the application, and time elapsed from initiating the request; storing the tracing data in a volatile memory to facilitate the tracing data to be transmitted to a database server; and causing the request to be processed by a computing server hosting the dedicated processing resource.

According to a third aspect of the present disclosure, there is provided a computer readable medium. The computer readable medium stores machine executable instructions thereon, the machine executable instructions, when executed by at least one processor, causing the at least one processor to implement the method according to the first aspect.

The Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION

The preferred embodiments of the present disclosure will be described in more details with reference to the drawings. Although the drawings illustrate the preferred embodiments of the present disclosure, it should be appreciated that the present disclosure can be implemented in various manners and should not be limited to the embodiments described herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first," "second" and so on can refer to same or different objects. The following text also can comprise other explicit and implicit definitions.

As described above, dedicated processing resources can be provided locally at the client or by a remote machine or system. In some examples, it can deploy a cloud-based computing system, which includes a plurality of machines having one or more dedicated processing resources. The dedicated processing resources of the computing system can be utilized by different clients based on their needs to dispatch the corresponding applications to operate on available dedicated processing resources.

Figure 1:
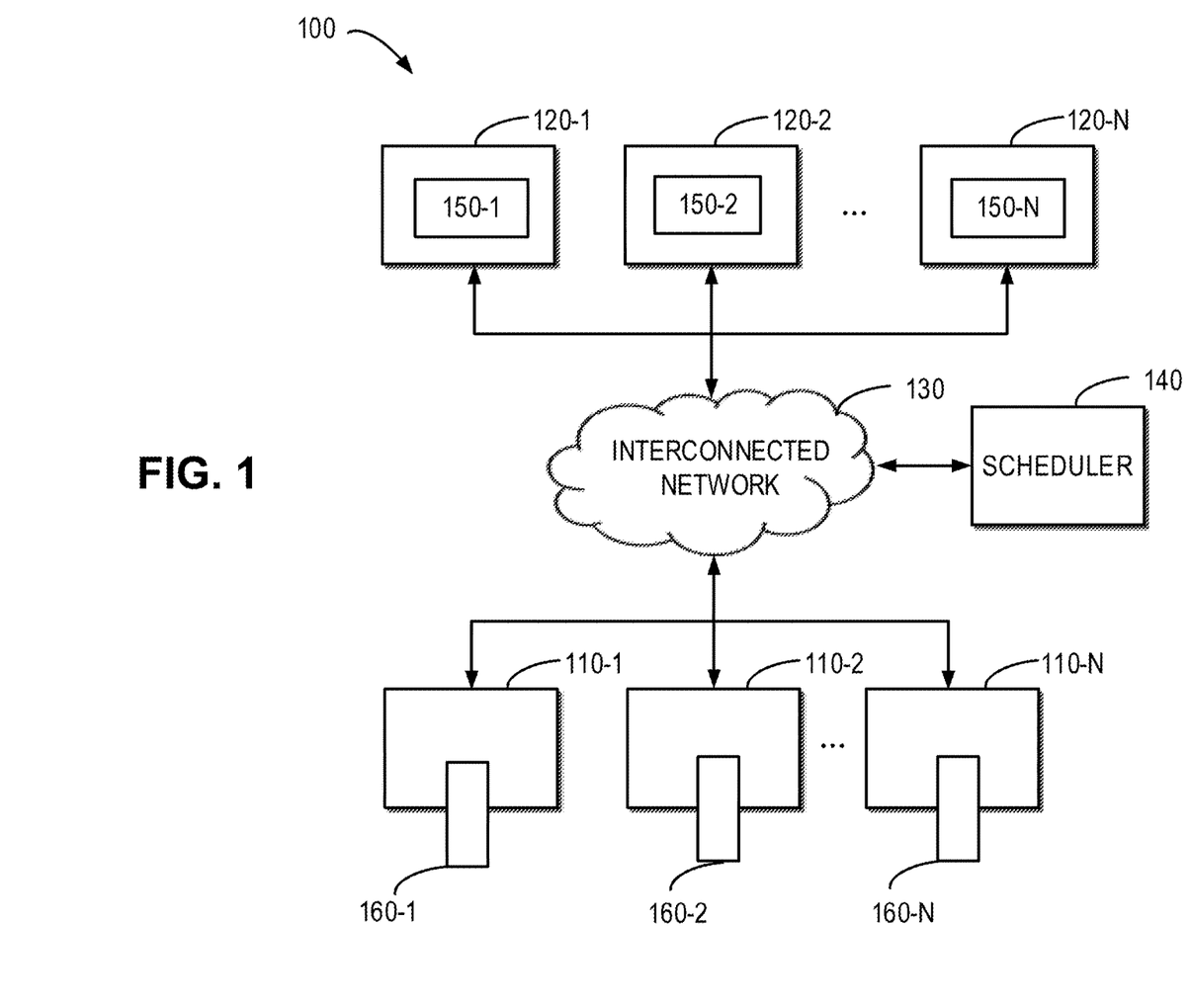
FIG. 1 is a schematic block diagram illustrating a system in which some embodiments of the present disclosure can be implemented.

FIG. 1 is a schematic diagram illustrating an example computing system 100 in which embodiments of the present disclosure can be implemented. A plurality of servers for running applications, including server 110-1, server 110-2, . . . , server 110-N (hereinafter collectively referred to as server 110, wherein N is a natural number greater than 1), is deployed in the computing system 100. The computing system 100 further includes a dedicated processing resource 160-1, a dedicated processing resource 160-2, . . . , a dedicated processing resource 160-N (hereinafter collectively referred to as a dedicated processing resource 160, wherein N is a natural number greater than 1). Each server 110 has one or more dedicated processing resources 160.

In the example of FIG. 1, the server 110-1 has the dedicated processing resource 160-1, the server 110-2 has the dedicated processing resource 160-2, and the server 110-N has the dedicated processing resource 160-N. Examples of the dedicated processing resource 160 may include, but are not limited to, a Graphics Processing Unit (GPU), a Field Programmable Gate Array (FPGA), or the like. For the sake of discussion, some embodiments will take a GPU as the example of the dedicated processing resources. In addition to the dedicated processing resource 160, the server 110 may further include, for example, one or more general processing units such as a central processing unit (CPU) (not shown).

FIG. 1 illustrates a plurality of clients 120-1, 120-2, . . . , 120-N (hereinafter collectively or individually referred to as a client 120, wherein N is a natural number greater than 1) respectively having applications 150-1, 150-2, . . . , 150-N (hereinafter collectively referred to as application 150, wherein N is a natural number greater than 1) to run. The application 150 may be any applications running on the machine, and the application can be designed to perform corresponding data processing or analyzing tasks. As an example, the application 150 can perform data processing or analyzing tasks associated with high performance computing (HPC), machine learning (ML) or deep learning (DL), artificial intelligence (AI), and/or the like. To quickly and efficiently run these applications and/or save local processing resources, the client 120 may request the dedicated processing resource 160 of the server 110 to run these applications 150. In such an implementation, the client 120 may be connected via an interconnected network 130 to one or more servers 110 and hand the application 150 over to be run by one or more dedicated processing resources 160 of the server 110. The interconnected network 130 can support different types of wired or wireless connections based on various network transmission techniques, for example, remote direct memory access (RDMA), transmission control protocol (TCP) or the like, depending on interfaces supported by the client 120, the server 110 and/or the dedicated processing resource 160.

It should be understood that the device and/or arrangement as shown in FIG. 1 is provided as an example only. In other examples, the computing system 100 can include any suitable number of servers 110 and clients 120. Each server 110 can be mounted with any suitable number of dedicated processing resources 160 and each client 120 can have a plurality of applications 150 to run. In addition, the scheduler 140, although separately shown, can be implemented by other devices independent of the server 110 in the practical application, or can be implemented at least in part on one or more servers 110.

To describe in a clear and concise manner, example embodiments of the present disclosure will be described in detail by mainly taking the GPU kernel as an example. It is known that a GPU, as a dedicated processor, has strong computing capability due to a large amount of kernels and high-bandwidth memory. In the GPU hardware architecture, one GPU usually has a large amount of GPU kernels, such as 5120 or up to 10000 kernels. The GPU kernel, as a dedicated processing resource, is the most basic processing unit, which is also known as a stream processor (SP). Instructions and tasks are eventually processed on the GPU kernel. A plurality of GPU kernels simultaneously executes the instructions to implement parallel computing of the GPU. A plurality of SPs, in addition to other resources such as register and shared memory, can compose one stream multiprocessor (SM).

However, it should be understood that GPU is only an example dedicated processing resource, and shall not limit the scope of the present disclosure. Spirits and principles described herein can be applied into other dedicated processing resources, for example processing resources in an accelerator such as an FPGA currently known or to be developed in the future, without limiting to the GPU kernel only.

Figure 2:
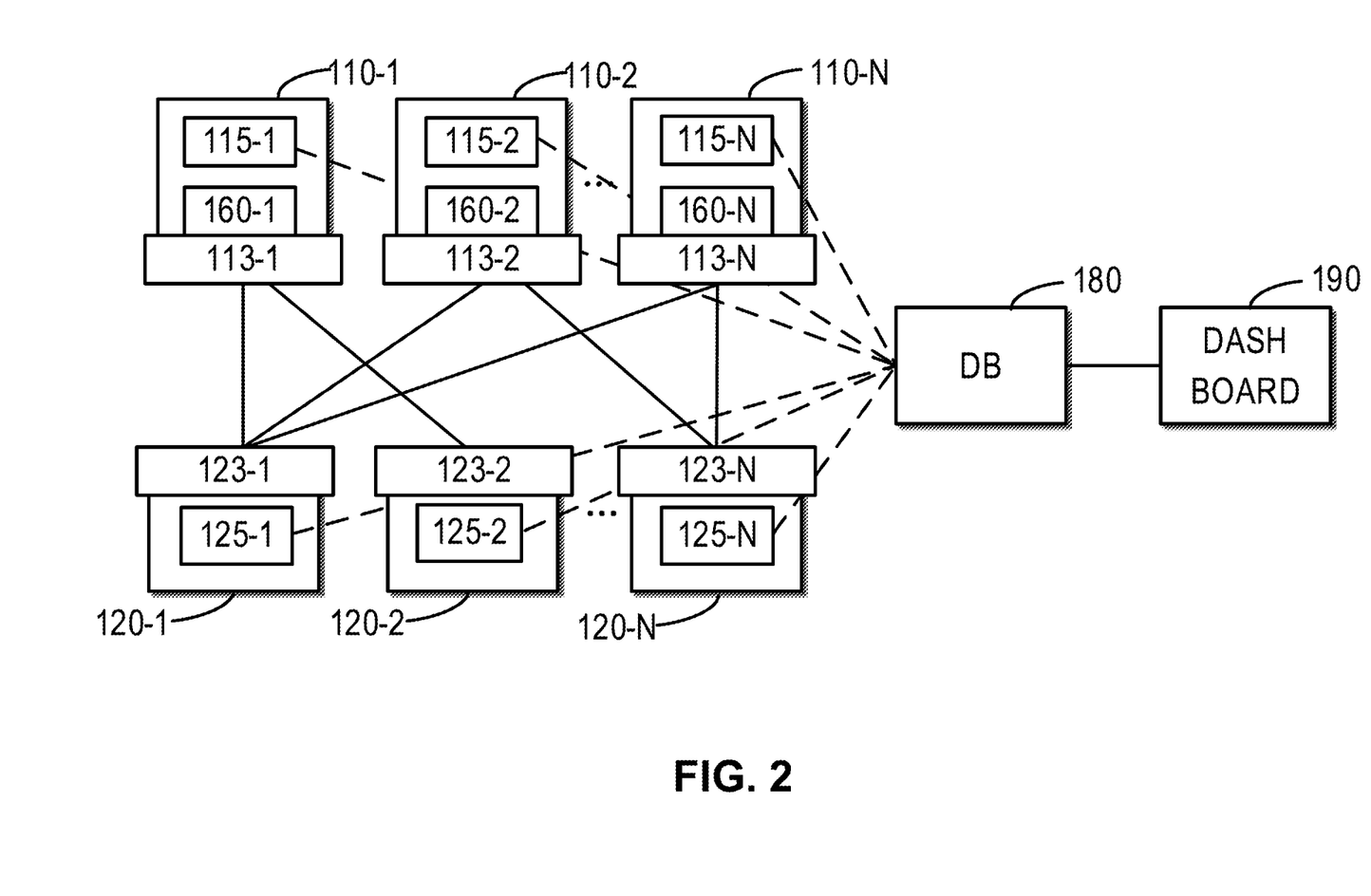
FIG. 2 is a schematic block diagram illustrating a distributed architecture for tracing according to some embodiments of the present disclosure.

FIG. 2 illustrates a distributed architecture for tracing a computing system according to some embodiments of the present disclosure. As shown in FIG. 2, the server 110 and the client 120 are nodes of the computing system 100, and the connection between the server 110 and the client 120 can be many-to-many, and the present disclosure is not limited in this regard. The GPU resources may be located only on the server 110, and the application (not shown) can be run on the client 120 and consumes GPU resources at the client 110. Alternatively or additionally, the client 120 may further include GPU resources to perform simple processing and graphic rendering. As tasks and instructions are essentially processed by the dedicated computing resources on the server 110, the server 110 may also be referred to as a computing server. However, for the sake of simplicity, the computing server will be referred to as the server for short without causing any confusion.

Applications executed on the server 120 can initiate a request, which can request dedicated processing resources for one task, such as GPU resources. For example, the request can be a function call of an application program interface (API) of the dedicated processing resources (e.g., GPU resources), and the corresponding tasks may be to perform the function.

In some embodiments, the request may include various kinds of information, such as, application identifiers, parameters for performing tasks and a timestamp indicating the time when the request is initiated. For example, such information may be included in a header of the request. In some embodiments, the application identifier identifies and distinguishes different applications. For example, the application may obtain the application identifier from the scheduler 140 as shown in FIG. 1. The scheduler 140 can maintain each application identifier to ensure that the identifier is unique in the cluster. As another example, the client 120 can locally configure a universally unique identifier (UUID). For example, if the collision probability is low, the UUID may be configured by a random ID.

In addition, the application can support multi-user operation. For example, different users can use the same application by different accounts. In this case, the request may further indicate the user of the application. For example, the header of the request may include a field indicative of different users.

As described above, the dedicated processing resource may be a GPU, and the parameters for executing the tasks may include API parameters for the GPU, such as memory size, kernel function name, thread count, block number, and the like. In one example, the API may be a compute unified device architecture (CUDA) API.

As shown in FIG. 2, a monitoring module 113 may be configured at the server 110. For example, the server 110-1 includes a monitoring module 113-1, the server 110-2 includes a monitoring module 113-2, the server 110-N includes a monitoring module 113-N, and so forth. These monitoring modules may be collectively referred to as monitoring module 113. According to FIG. 2, a monitoring module 123 may also be configured at the client 120. For example, the client 120-1 includes a monitoring module 123-1, the client 120-2 includes a monitoring module 123-2, the client 120-N includes a monitoring module 123-N, and so forth. These monitoring modules may be collectively referred to as monitoring module 123.

The monitoring module 113 or 123 may extract from the request the tracing data, including application identifier, task parameter(s) and the time elapsed from initiating the request. If the application supports multi-user operations, a user identifier may be extracted from the request. In some embodiments, the request may be implemented in the level of the underlying GPU driver API to improve performance. For example, in CUDA API, it may determine the elapsed time by the GPU event running in the GPU hardware.

In some embodiments, the tracing data may be stored in the server 110 or the corresponding volatile memory of the client 120. For example, the data may be stored in a predefined binary format to save storage space. The volatile memory may be a ring buffer to facilitate storage of the buffer data flow. However, if the volatile memory is insufficient for the tracing data, data recorded by the monitoring module 123 will be moved to a local memory, for example, a non-volatile memory.

Table 1 illustrates an example of the binary storage format according to an example embodiment of the present application. However, it should be understood that this format is only exemplary without limiting the scope of the present disclosure. Additions, deletions, and modifications may be made to the contents of the table without departing from the scope of the present disclosure.

TABLE 1

| Data type | Byte | Item | Comments |
| --- | --- | --- | --- |
| uint64 | 8 | clientID | application identifier (and identifier of user) |
| uint64 | 8 | TimeStamp | for example, in unit of ns |
| uint64 | 8 | flag | flag |
| uint64 | 8 | size | for example, indicating memory size in case of memory copy |

TABLE 1-continued

| Data type | Byte | Item | Comments |
| --- | --- | --- | --- |
| uint16 | 2 | opCode | API code |
| uint32 | 4 | Kernel.gridDimX | CUDA kernel parameter |
| uint32 | 4 | Kernel.gridDimY | |
| uint32 | 4 | Kernel.gridDimZ | |
| uint32 | 4 | Kernel.blockDimX | |
| uint32 | 4 | Kernel.blockDimY | |
| uint32 | 4 | Kernel.blockDimZ | |
| uint64 | 8 | streamID | |
| uint32 | 4 | Kernel.shareMemSz | |
| uint32 | 32 | functionName | |

FIG. 2 illustrates agents 115-1, 115-2, . . . , 115-N (hereinafter collectively or individually referred to as agent 115) within the corresponding server 110. The agent 115 may be responsible for parsing the tracing data stored in the volatile memory or the non-volatile memory, such as binary data, and converting the tracing data into data points understandable by a time series database. The agent 115 may transmit the tracing data (for example, time series data point) to the database (DB) 180 via an HTTP-based server, for example. Because tracing and monitoring of the computing system are performed out of band, it will not impact request transmission and instruction execution.

In addition, FIG. 2 illustrates agents 125-1, 125-2, . . . , 125-N (hereinafter collectively or individually referred to as agent 125) included in the corresponding client 120, and the agent 125 may be configured in a similar way as the agent 115. In this way, it may decouple collection and parsing of the tracing data, such that they do not interfere with each other.

In some embodiments, the database 180 may be a time series database (TSDB) to facilitate management of the time-varying data. The server hosting the database 180 (also referred to as a database server) may be periodically connected to the agents 115 and 125 on the respective server 110 and client 120, and collect the latest data points via HTTP. For example, the time interval may be set as 5 to 30 seconds, which may be flexibly configured based on the specific needs. TSDB also may provide the interface for querying the tracing data. For example, the application for different GPUs or nodes may be associated via the identifier of the application to analyze the corresponding data.

As shown in FIG. 2, a dashboard 190 is connected to the database 180, and may include one or more predefined query rules to visualize the data points. The dashboard 190 may further provide various templates, such that the operator may select the desired data from a vast amount of tracing data based on the application identifier and/or the like. For example, the user may select the tracing data of a certain application from the tracing data.

According to different embodiments of the present disclosure, this architecture may conveniently and effectively work in a distributed environment. In addition, this architecture may be independent of a particular application platform or framework, and support various types of applications, for example, different deep learning frameworks. By performing out-of-band tracing and monitoring, some embodiments may implement near real-time monitoring and do not need to wait for the completion of the task operation and then analyze the computing system by analyzing the log data and the like. By transmitting the tracing data to the database for management, some embodiments implement centralized management so as to effectively perform management and configuration. Moreover, due to the use of an application identifier, some embodiments may associate corresponding tracing data with the application when the application employs many GPUs or many servers.

Figure 3:
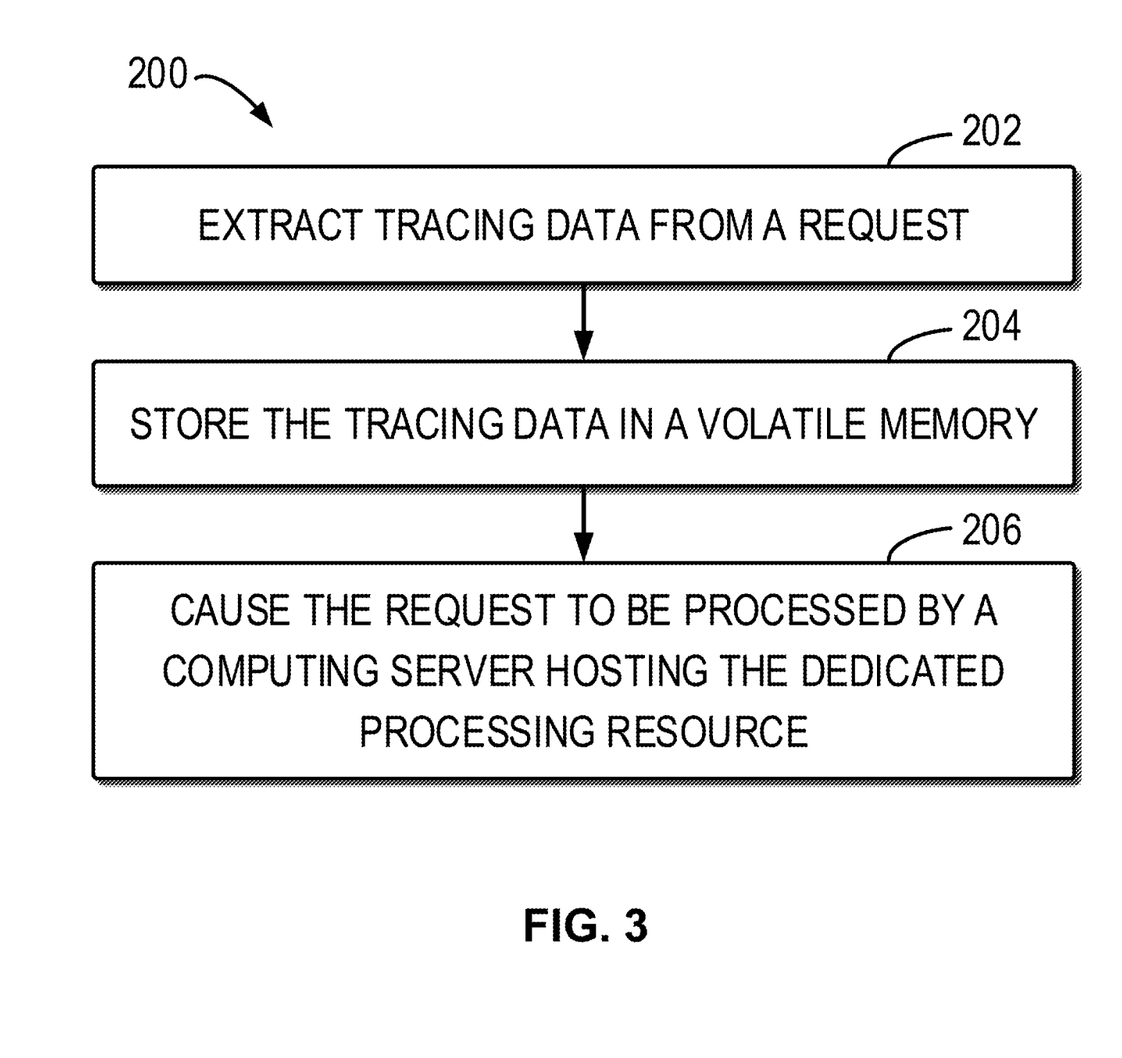
FIG. 3 is a flowchart illustrating a method for tracing the computing system according to some embodiments of the present disclosure.

FIG. 3 is a flowchart illustrating a method 200 for tracing a computing system according to embodiments of the present disclosure. The method 200 may be performed at the client 120 as shown in FIG. 2, for example, at the monitoring module 123 as shown in FIG. 2. Additionally or alternatively, the method 200 may be executed at the server 110, for example, at the monitoring module 113 as shown in FIG. 2.

At block 202, the tracing data is extracted from a request, the tracing data including a parameter for executing a task, an identifier of an application, and time elapsed from initiating the request. As described above, the information associated with the above tracing data may be included in the request, in particular in the header of the request. Therefore, the information may be extracted from the request. In some embodiments, the application may support multiple users, so the request may indicate different users. In this case, an identifier of the user may be extracted from the request as a part of the tracing data.

At block 204, the tracing data is stored in the volatile memory to facilitate transmission of the tracing data to the database server. For example, the volatile memory may be a ring buffer to facilitate storage of the buffer data flow. If the method 200 is performed by the client 120, the tracing data may be stored in the volatile memory of the client 120. The client 120 may also include a non-volatile memory. If the volatile memory of the client 120 is insufficient for storing the tracing data, the tracing data may be moved from the volatile memory to the non-volatile memory.

If the method 200 is performed at the server 110, the tracing data may be stored in the volatile memory of the server 110. The server 110 may include a non-volatile memory. If the volatile memory of the server 110 is insufficient for storing the tracing data, the tracing data may be moved from the volatile memory to the non-volatile memory.

At block 206, the request may be caused to be processed by the server 110 hosting the dedicated processing resource. If the method 200 is performed at the client 120, the request may be transmitted to the server 110 to enable the server 110 to process the request. Moreover, the client 120 may also receive from the server 110 the result of processing the task with the dedicated processing resource (for example, GPU resource).

If the method 200 is performed at the server 110, the method 200 may further include receiving the request from the client 120. In addition, the method 200 may include processing the task with the dedicated processing resources to obtain the result of performing the task, and transmitting the result of performing the task to the client 120.

In some embodiments, the database server may host the time series database, as shown in FIG. 2. In this case, the method 200 also may include obtaining the tracing data from the volatile memory and converting the obtained tracing data into time series data points. The time series data points may be transmitted to the database memory and stored in the time series database accordingly.

Figure 4:
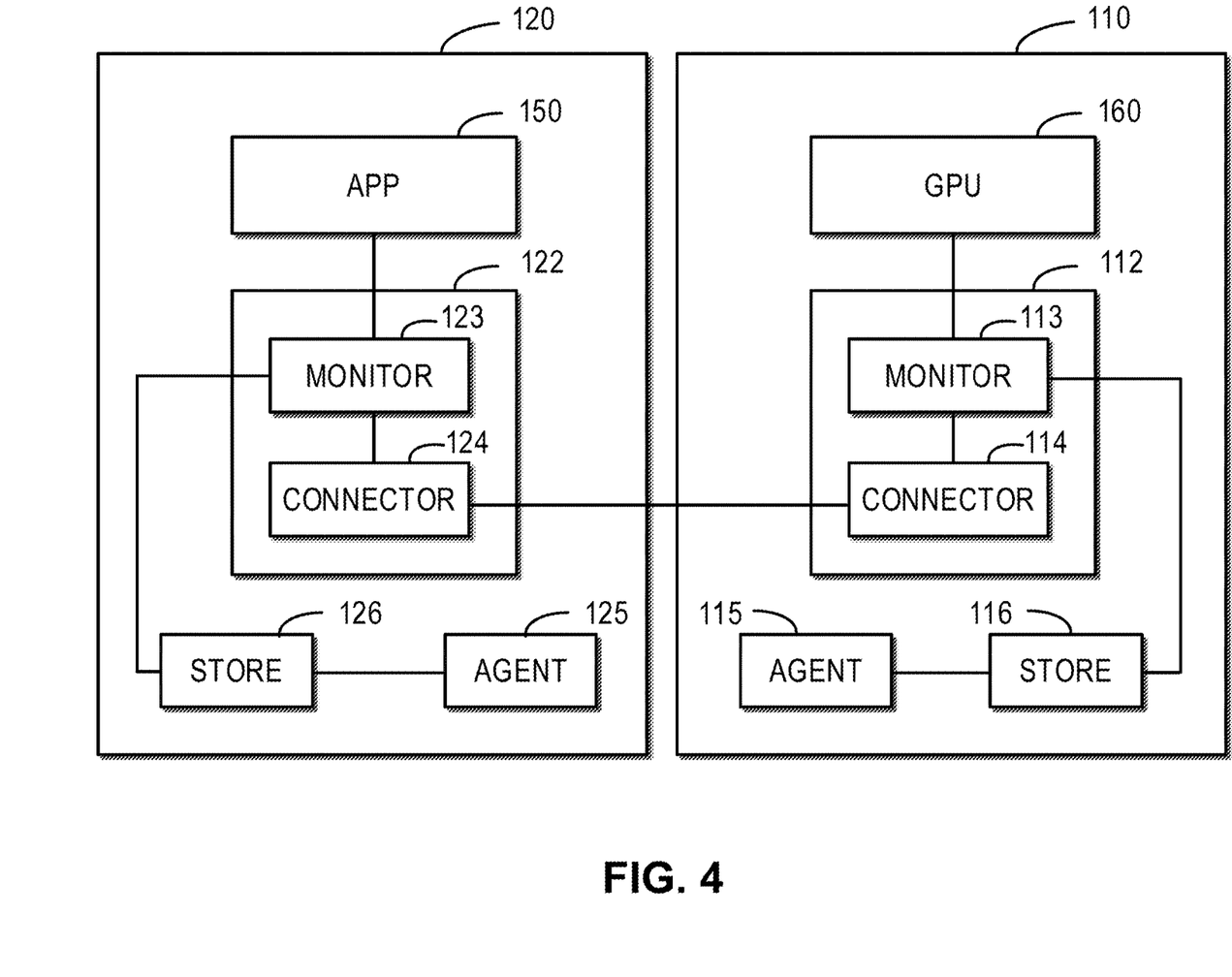
FIG. 4 is a schematic block diagram illustrating a part of the computing system according to some embodiments of the present disclosure.

FIG. 4 is a schematic block diagram illustrating a part of the computing system according to some embodiments of the present disclosure. As shown in FIG. 4, the application 150 initiates a request, which requests a GPU resource for one task. For example, the request may be a function call for the API function of GPU. For example, the application 150 may call the GPU API without knowing the underlying system.

The client module 122 is connected to the application 150 to receive the request, and includes the monitoring module 123 and a connector 124. The monitoring module 123 may extract from the request the tracing data including an application identifier, one or more parameters for executing the task, and time elapsed from initiating the request. The tracing data may be stored in a store 126 without interrupting request transmission and task execution. Subsequently, the request may be transmitted to the connector 124, which encapsulates or packages the request and then transmits the request to the server 110 for further processing.

The server 110 may include a server module 112 including a connector 114 and a monitoring module 113. When the connector 114 receives a request from the client 120, the connector 114 transmits the request to the monitoring module 113, which extracts tracing data from the request and stores the tracing data in a store 116 without interrupting normal processing process.

The agent 125 on the client 120 may continuously, periodically, or otherwise monitor the store 126. If the store 126 has new data, the agent 125 may collect and parse the data and convert it into time series data points. For example, as described above, the store 126 may include a volatile memory and optionally a non-volatile memory.

The agent 115 on the server 110 may continuously, periodically, or otherwise monitor the store 116. If the store 116 has new data, the agent may collect and parse the data and convert it into time series data points. For example, the store 116 may include a volatile memory and optionally a non-volatile memory.

Figure 5:
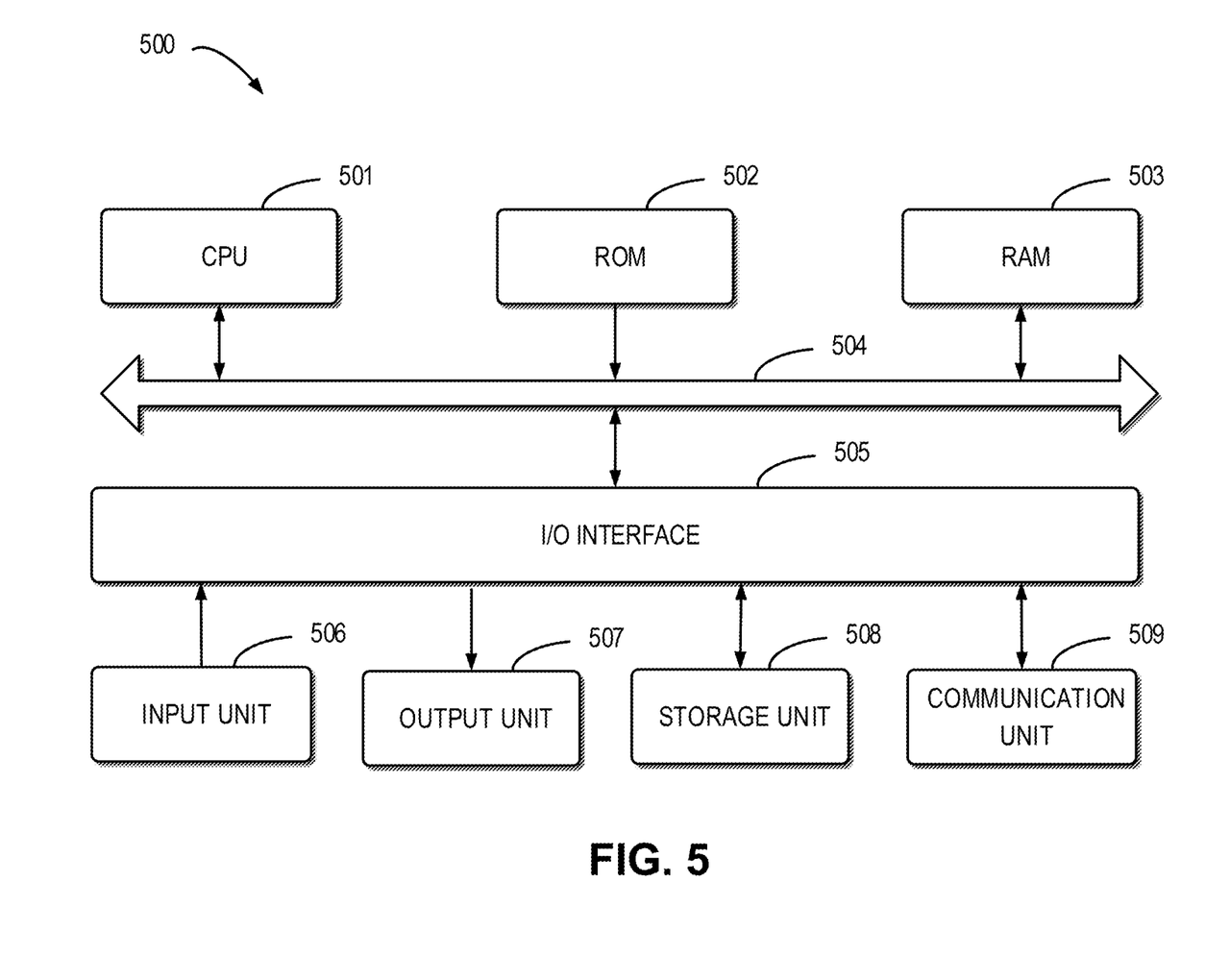
FIG. 5 is a schematic block diagram illustrating a device 500 for implementing embodiments of the present disclosure.

FIG. 5 illustrates a schematic block diagram of an example device 500 for implementing embodiments of the present disclosure. As shown, the device 500 includes a central processing unit (CPU) 501, which can execute various suitable actions and processing based on the computer program instructions stored in the read-only memory (ROM) 502 or computer program instructions loaded in the random-access memory (RAM) 503 from a storage unit 508. The RAM 503 can also store all kinds of programs and data required by the operations of the device 500. CPU 501, ROM 502 and RAM 503 are connected to each other via a bus 504. The input/output (I/O) interface 505 is also connected to the bus 504.

A plurality of components in the device 500 are connected to the I/O interface 505, including: an input unit 506, such as keyboard, mouse and the like; an output unit 507, e.g., various kinds of display and loudspeakers etc.; a storage unit 508, such as magnetic disk and optical disk etc.; and a communication unit 509, such as network card, modem, wireless transceiver and the like. The communication unit 509 allows the device 500 to exchange information/data with other devices via the computer network, such as Internet, and/or various telecommunication networks.

The above described procedures and processing, such as method 200, can also be executed by the processing unit 501. For example, in some embodiments, the method 200 can be implemented as a computer software program tangibly included in the machine-readable medium, e.g., storage unit 508. In some embodiments, the computer program can be partially or fully loaded and/or mounted to the device 500 via ROM 502 and/or communication unit 509. When the computer program is loaded to RAM 503 and executed by the CPU 501, one or more steps of the above described method 200 or 300 can be implemented. Alternatively, in other embodiments, CPU 501 also can be configured in other suitable manners to realize the above procedure/method.

The present disclosure can include a method, a device, a system and/or a computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, electrical storage devices, magnetic storage devices, optical storage devices, electromagnetic storage devices, semiconductor storage devices or any appropriate combinations of the above. More concrete examples of the computer-readable storage medium (non-exhaustive list) include: portable computer disk, hard disk, RAM, ROM, erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized herein is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network (LAN), wide area network (WAN) and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of networks, including LAN and WAN, or to the external computer (e.g., connected via Internet using the Internet service provider). In some embodiments, state information of the computer-readable program instructions is used to customize an electronic circuit, e.g., programmable logic circuit, FPGA or programmable logic array (PLA). The electronic circuit can execute computer-readable program instructions to implement various aspects of the present disclosure.

Various aspects of the present disclosure are described herein with reference to a flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagrams in the drawings illustrate system architecture, functions and operations that may be implemented by a system, method and computer program product according to multiple implementations of the present disclosure. In this regard, each block in the flow chart or block diagrams can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagrams and/or flow chart and combinations of the blocks in the block diagrams and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, to enable those of ordinary skill in the art to understand implementations of the present disclosure.

What is claimed is:

1. A method of tracing a computing system, comprising:
    extracting tracing data from a request that requests a dedicated processing resource for a task, the request being initiated by an application executed on a client and the tracing data including a parameter for performing the task, an identifier of the application, and time elapsed from initiating the request;
    storing the tracing data in a volatile memory to facilitate the tracing data to be transmitted to a database server; and
    causing the request to be processed by a computing server hosting the dedicated processing resource;
    wherein the dedicated processing resource comprises a kernel-based processing unit of a particular type;
    wherein the tracing data comprises at least one kernel function name of the kernel-based processing unit;
    wherein storing the tracing data in the volatile memory comprises storing the tracing data in a storage-efficient format that includes at least one specified field for storing information identifying said at least one kernel function name; and
    wherein the database server hosts a time series database, and wherein the method further comprises:
    obtaining the tracing data from the volatile memory;
    converting the obtained tracing data into time series data points; and
    causing the time series data points to be transmitted to the database server to be stored in the time series database.

2. The method of claim 1, wherein the tracing data is extracted at the client, the volatile memory is included in the client, and causing the request to be processed by the computing server comprises:
    transmitting the request to the computing server.

3. The method of claim 2, further comprising:
    receiving, from the computing server, a result of processing the task with the dedicated processing resource.

4. The method of claim 2, wherein the client further comprises a non-volatile memory, and wherein the method further comprises:
    in response to the volatile memory being insufficient for storing the tracing data, moving the tracing data from the volatile memory to the non-volatile memory.

5. The method of claim 1, wherein the tracing data is extracted at the computing server, the volatile memory is included in the computing server, and the method further comprises:
    receiving, at the computing server, the request from the client.

6. The method of claim 5 further comprising:
    processing the task with the dedicated processing resource of the computing server to obtain a result of performing the task; and
    transmitting the result of performing the task to the client.

7. The method of claim 5, wherein the computing server further comprises a non-volatile memory, and wherein the method further comprises:
    in response to the volatile memory being insufficient for storing the tracing data, moving the tracing data from the volatile memory to the non-volatile memory.

8. The method of claim 1, wherein the request indicates a user of the application, and wherein the method further comprises:
    extracting from the request an identifier of the user as a part of the tracing data.

9. The method of claim 1, wherein the volatile memory is a ring buffer.

10. The method of claim 1, wherein the dedicated processing resource is a Graphics Processing Unit (GPU).

11. The method of claim 1, wherein the request is a function call for an Application Program Interface (API) of the dedicated processing resource.

12. A device for tracing a computing system, comprising:
    at least one processor;
    a volatile memory; and
    a memory coupled to the at least one processor and having instructions stored thereon, the instructions, when executed by the at least one processor, causing the device to perform acts comprising:
    extracting tracing data from a request that requests a dedicated processing resource for a task, the request being initiated by an application executed on a client and the tracing data including a parameter for performing the task, an identifier of the application, and time elapsed from initiating the request;
    storing the tracing data in the volatile memory to facilitate the tracing data to be transmitted to a database server; and
    causing the request to be processed by a computing server hosting the dedicated processing resource;
    wherein the dedicated processing resource comprises a kernel-based processing unit of a particular type;
    wherein the tracing data comprises at least one kernel function name of the kernel-based processing unit;
    wherein storing the tracing data in the volatile memory comprises storing the tracing data in a storage-efficient format that includes at least one specified field for storing information identifying said at least one kernel function name; and
    wherein the database server hosts a time series database, and wherein the acts further comprise:
    obtaining the tracing data from the volatile memory;
    converting the obtained tracing data into time series data points; and
    causing the time series data points to be transmitted to the database server to be stored in the time series database.

13. The device of claim 12, wherein the device is a client, and wherein causing the request to be processed by the computing server comprises:
    transmitting the request to the computing server.

14. The device of claim 13, wherein the acts further comprise:
    receiving from the computing server a result of processing the task with the dedicated processing resource.

15. The device of claim 13, wherein the client further comprises a non-volatile memory, and wherein the acts further comprise:
    in response to the volatile memory being insufficient for storing the tracing data, moving the tracing data from the volatile memory to the non-volatile memory.

16. The device of claim 12, wherein the device is the computing server, and wherein the acts further comprise:
    receiving, at the computing server, the request from the client.

17. The device of claim 16, wherein the acts further comprise:
    processing the task with the dedicated processing resource of the computing server to obtain a result of performing the task; and
    transmitting to the client the result of performing the task.

18. The device of claim 16, wherein the computing server further comprises a non-volatile memory, and wherein the acts further comprise:

in response to the volatile memory being insufficient for storing the tracing data, moving the tracing data from the volatile memory to the non-volatile memory.

19. A computer readable medium storing machine executable instructions thereon, the machine executable instructions, when executed by at least one processor, causing the at least one processor to implement a method of tracing a computing system, comprising:

extracting tracing data from a request that requests a dedicated processing resource for a task, the request being initiated by an application executed on a client and the tracing data including a parameter for performing the task, an identifier of the application, and time elapsed from initiating the request;

storing the tracing data in a volatile memory to facilitate the tracing data to be transmitted to a database server; and causing the request to be processed by a computing server hosting the dedicated processing resource;

wherein the dedicated processing resource comprises a kernel-based processing unit of a particular type;

wherein the tracing data comprises at least one kernel function name of the kernel-based processing unit;

wherein storing the tracing data in the volatile memory comprises storing the tracing data in a storage-efficient format that includes at least one specified field for storing information identifying said at least one kernel function name; and wherein the database server hosts a time series database, and wherein the method further comprises:

obtaining the tracing data from the volatile memory;

converting the obtained tracing data into time series data points; and causing the time series data points to be transmitted to the database server to be stored in the time series database.

20. The computer readable medium storing machine of claim 19, wherein the tracing data is extracted at the client, the volatile memory is included in the client, and causing the request to be processed by the computing server comprises:

transmitting the request to the computing server.

* * * * *